June 2, 1970  G. L. GUINOT  3,515,298
TURRET EARTHWORKING MACHINE
Filed June 20, 1968  2 Sheets-Sheet 1

INVENTOR
GABRIEL L. GUINOT
BY
Mason, Fenwick & Lawrence
ATTORNEYS

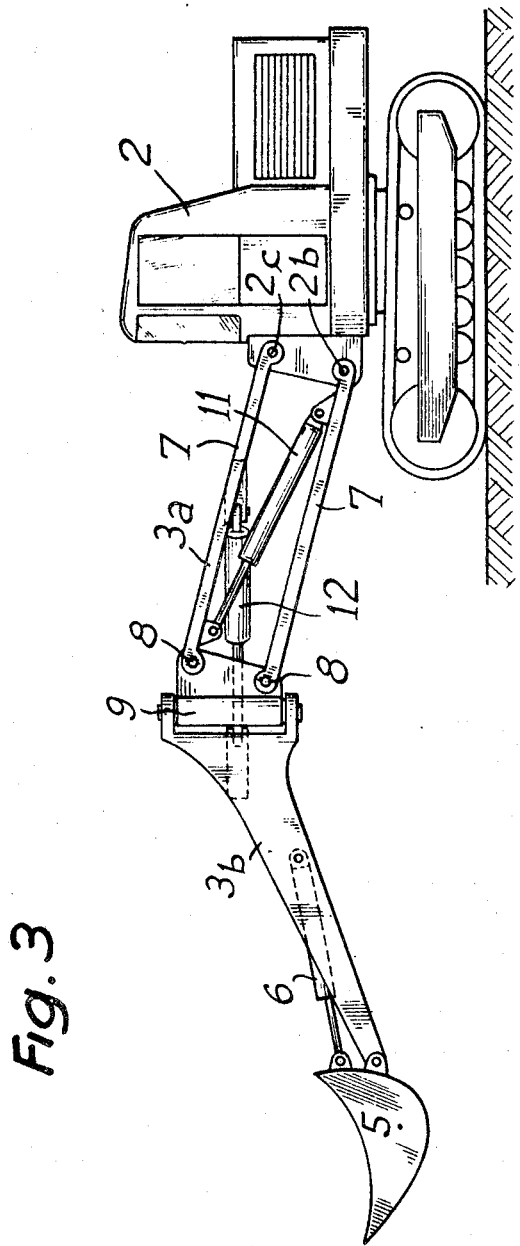

United States Patent Office 3,515,298
Patented June 2, 1970

3,515,298
TURRET EARTHWORKING MACHINE
Gabriel L. Guinot, Le Plessis-Belleville, Oise, France, assignor to Societe Anonyme Poclain, Le Plessis-Belleville, Oise, France, a French society
Filed June 20, 1968, Ser. No. 738,691
Claims priority, application France, June 21, 1967, 111,338
Int. Cl. E02f 3/30
U.S. Cl. 214—138                                              5 Claims

ABSTRACT OF THE DISCLOSURE

A turret earthworking machine in which a boom is mounted on the turret for upward and downward swinging movement and having at its free end a bucket controlled by a hydraulic cylinder assembly, the boom consisting of a pair of boom sections pivoted together about an axis perpendicular to the axis of the swinging movement. A hydraulic cylinder assembly is connected to each boom section, and the bucket is of the loader type with its leading edge directed away from the turret, the axis of articulation between the two boom sections being substantially vertical when the bucket is in the vicinity of the ground.

---

The present invention relates to earthworking machines having a turret pivotally mounted on a chassis and a boom mounted on the turret for upward and downward movement in a vertical plane, the boom being equipped with a working tool. It is known that such machines usually work by causing a beam mounted at the end of the boom to oscillate between two positions, and that by rotating the turret such machines can unload the materials which they have collected into a vehicle without it being necessary for the machine itself to move. Other machines are known which are generally referred to as loaders and in which the tool supporting beam is mounted directly on the chassis. Such loaders work by moving the chassis itself and thus are capable of great penetration into piles of material. However, in order to unload collected materials into a vehicle the machine itself must be maneuvered and this leads to a considerable waste of time.

A main object of the present invention is to provide an improved turret earthworking machine having the advantages of known machines and which facilitates to the maximum penetration into piles constituted by loose material such as earth, grain, gravel, etc., particularly when using a loading bucket.

To this effect, the invention is concerned with a turret earthworking machine in which the upwardly and downwardly moving boom has at its end a loading bucket controlled by a hydraulic cylinder assembly.

According to the invention, the boom consists of two boom sections pivotally connected together, having a pivot axis disposed perpendicular to the axis on the turret about which the boom moves upwardly and downwardly, the axis of articulation between the two boom sections being substantially vertical when the loading bucket is in the vicinity of the ground, and a hydraulic cylinder assembly being operatively connected to each boom section.

In a preferred embodiment of the invention, the boom section mounted on the turret for upward and downward movement is constituted by a deformable parallelogram of which the side remote from the turret carries a vertical pivot on which the mounted the forward element of the boom, a hydraulic cylinder assembly operatively interconnecting two sides, and preferably opposite sides, of the parallelogram.

Figure 1:
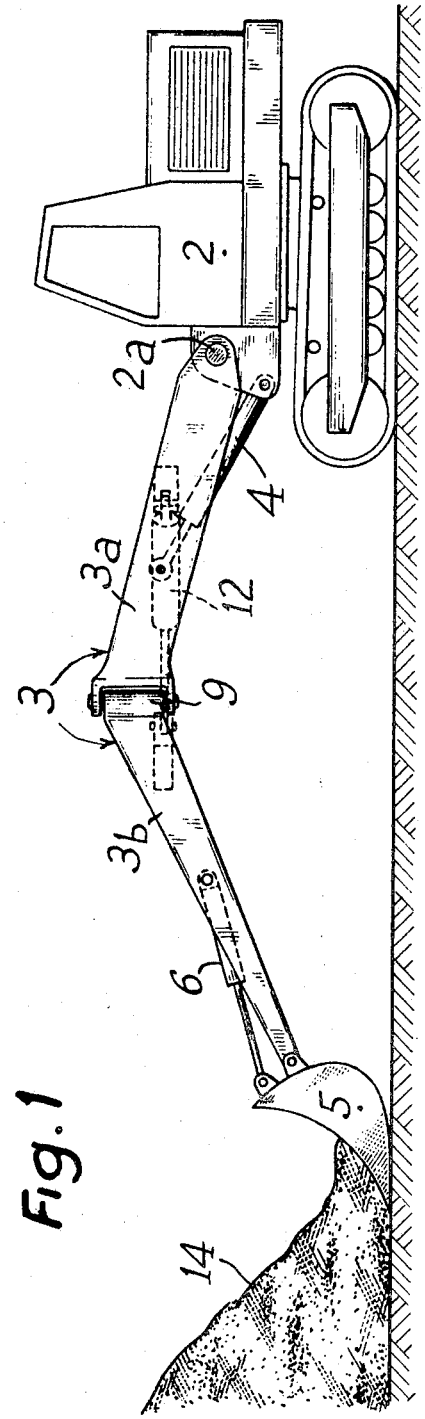
Figure 2:
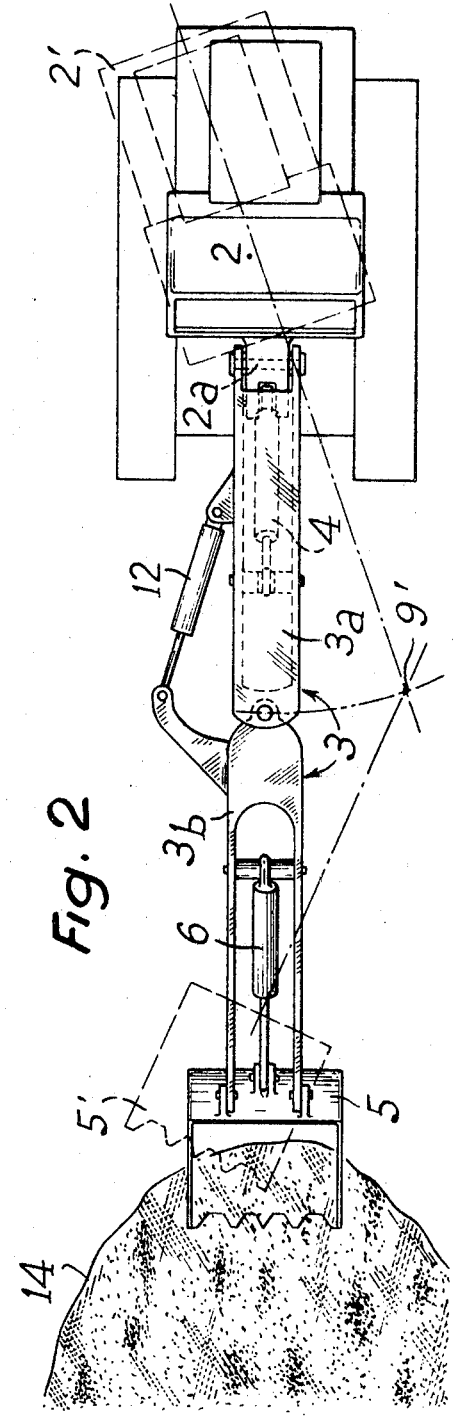

In order that the invention may be more fully understood, some embodiments in accordance therewith will now be described, by way of example, with reference to the accompanying drawings, in which:

FIG. 1 is a side elevation of a turret loader equipped with a boom according to the invention;
FIG. 2 is a plan view of the loader of FIG. 1;
FIG. 3 is a view similar to FIG. 1 of an alternative embodiment.

Referring to the drawings, FIGS. 1 and 2 show an earthworking machine designated 1 having a pivoting turret 2. The boom 3 of the machine is mounted for upward and downward movement on the turret 2 about a substantially horizontal axis 2a and its position in the vertical plane of upward and downward movement is controlled by a hydraulic cylinder assembly 4. The boom, at its free end, carries a loading bucket 5 actuated by a hydraulic cylinder assembly 6.

The boom 3 comprises two sections 3a and 3b articulated to each other about a pivot 9 whose axis is substantially perpendicular to the axis of upward and downward movement 2a. The pivot 9 is arranged in such a manner that its axis is substantially vertical, i.e. parallel to the axis of rotation of the turret, when the bucket 5 is in the vicinity of the ground. A hydraulic cylinder assembly 12 is coupled to each of the sections of the boom to enable their relative orientation to be adjusted and controlled.

In the embodiment shown in FIG. 3, the first section 3a of the boom is constituted by a deformable parallelogram comprising two parallel arms 7 mounted for upward and downward movement with respect to the turret about two horizontal parallel axes 2b, 2c. The arms 7 are pivoted at their other ends on a vertical pivot 9 on which the boom section 3b is freely mounted in rotation. The pivot 9 and the axis of rotation of the turret 2 are thus always parallel.

The deformation of the parallelogram is effected by a hydraulic cylinder assembly 11 mounted between the two arms 7, the line of action of the jack coinciding substantially with one of the diagonals of the parallelogram.

Finally, the forward section 3b of the boom is adapted to pivot about the pivot 9 by means of a hydraulic cylinder assembly 12 fixed at one end to one of the arms 7 of the parallelogram 3 and at the other end to the boom section 3b.

Such a device enables the penetration of the loading bucket 5 into a pile of material 14 to be greatly facilitated, particularly in the case the hard materials encountered during the working of quarries. In effect, the machine can use the entire driving force of its wheels, which force is applied to the bucket to cause it to penetrate the pile.

Moreover, due to the combination of the rotational movement of the turret 2 and the rotational movement of the boom section 3b about the pivot 9 by means of the hydraulic cylinder assembly 12, forces can be produced in various directions, and this also facilitates penetration of the bucket and if necessary the tearing up of rocks.

In FIG. 2 a working position 2' of the turret 2, the boom, and the bucket 5' is shown in dotted lines, the normal position of the boom being shown in full lines. The boom section 3b in the working position has pivoted about the pivot 9 which has moved to the position 9', and the bucket 5' is orientated in a manner different from its initial position 5.

The present invention is not limited to the embodiments described and shown above, but covers all variants thereof.

What is claimed is:
1. An earth working machine comprising a chassis, a turret rotatably mounted on said chassis, a first boom section pivotally mounted on said turret for movement in a substantially vertical plane, fluid actuated means op- eratively connected to said first boom section for pivoting said first boom section, a second boom section pivotally connected to the free end of said first boom section, forming an extension thereof, the axis of the pivotal connection between said boom sections being disposed perpendicular to the axis of the pivotal connection between said first boom section and said turret, fluid actuated means interconnecting said boom sections for pivoting said second boom section about the axis of the pivotal connection between said boom sections, a bucket pivotally mounted on the free end of said second boom section, said bucket having a forwardly disposed opening for receiving material therein, fluid actuated means operatively interconnecting said bucket and said second boom section for pivoting said bucket, and said second boom section being disposed at a fixed angle relative to the axis of the pivotal connection between said boom sections.

2. An earth working machine according to claim 1, wherein said second boom section is disposed at an angle to the axis of the pivotal connection between the boom sections whereby when said axis is disposed substantially vertically, said bucket will be disposed at substantially ground level.

3. An earth working machine according to claim 1, wherein said first boom section includes a pair of arm members forming a deformable parallelogram with the end portions of said first boom section.

4. An earth working machine according to claim 3, wherein said fluid actuated means for pivoting said first boom section operatively interconnects opposite ends of said arm members.

5. An earth working machine according to claim 4, wherein said fluid actuated means comprises a fluid cylinder assembly having a centerline intersecting said arm members.

References Cited

UNITED STATES PATENTS

| | | | |
|---|---|---|---|
| 2,348,899 | 5/1944 | Guignard et al. | 214—775 |
| 3,149,737 | 9/1964 | Guinot | 214—138 |
| 3,187,911 | 6/1965 | Christenson | 214—770 X |
| 3,239,083 | 3/1966 | Guinot | 214—138 |
| 3,283,928 | 11/1966 | Bosredon | 214—138 |
| 3,313,431 | 4/1967 | Kelly | 214—138 |

HUGO O. SCHULZ, Primary Examiner

U.S. Cl. X.R.

214—768